United States Patent [19]

Yoon

[11] Patent Number: 4,941,047

[45] Date of Patent: Jul. 10, 1990

[54] VIDEO SIGNAL COMPENSATING CIRCUIT OF A TV/VCR

[75] Inventor: Jin H. Yoon, Kyungsangbook-Do, Rep. of Korea

[73] Assignee: Goldstar Co., Ltd., Seoul, Rep. of Korea

[21] Appl. No.: 221,751

[22] Filed: Jul. 20, 1988

[51] Int. Cl.$^5$ .................. H04N 5/268; H04N 5/205; H04N 5/91

[52] U.S. Cl. .................................. 358/181; 358/184; 358/166

[58] Field of Search ................ 358/181, 184, 166, 188

[56] References Cited

U.S. PATENT DOCUMENTS 4,768,110  8/1988  Dunlap .................. 358/181
4,789,905  12/1988  Ezaki .................... 358/181

*Primary Examiner*—Tommy P. Chin
*Attorney, Agent, or Firm*—Rosen, Dainow & Jacobs

[57] ABSTRACT

A video signal compensating circuit for a TV/VCR comprising a first amplifier for amplifying TV video signal which is input from a TV video signal input terminal, a second amplifier for amplifying VCR video signal which is input from VCR video signal input terminal, a control signal generator, a switching element, a third amplifier for amplifying the output signal of the switching element, a first photocoupler for outputting a signal proportional to the output signal of the third amplifier, an output amplifier for amplifying and outputting the output signal of the first photocoupler, a second photocoupler which is turned on and off according to the control signal of the control signal generator, and a negative feedback element for varying the emitter output signal of the transistor of the output amplifier according to "ON" or "OFF" of the second photocoupler and then feedbacks negatively to the base of the light receiving transistor of the first photocoupler. The circuit provides TV/VCR with clear pictures by preventing the input of video noise signals according to the frequency differences between the TV video signal and the VCR video signal.

10 Claims, 1 Drawing Sheet

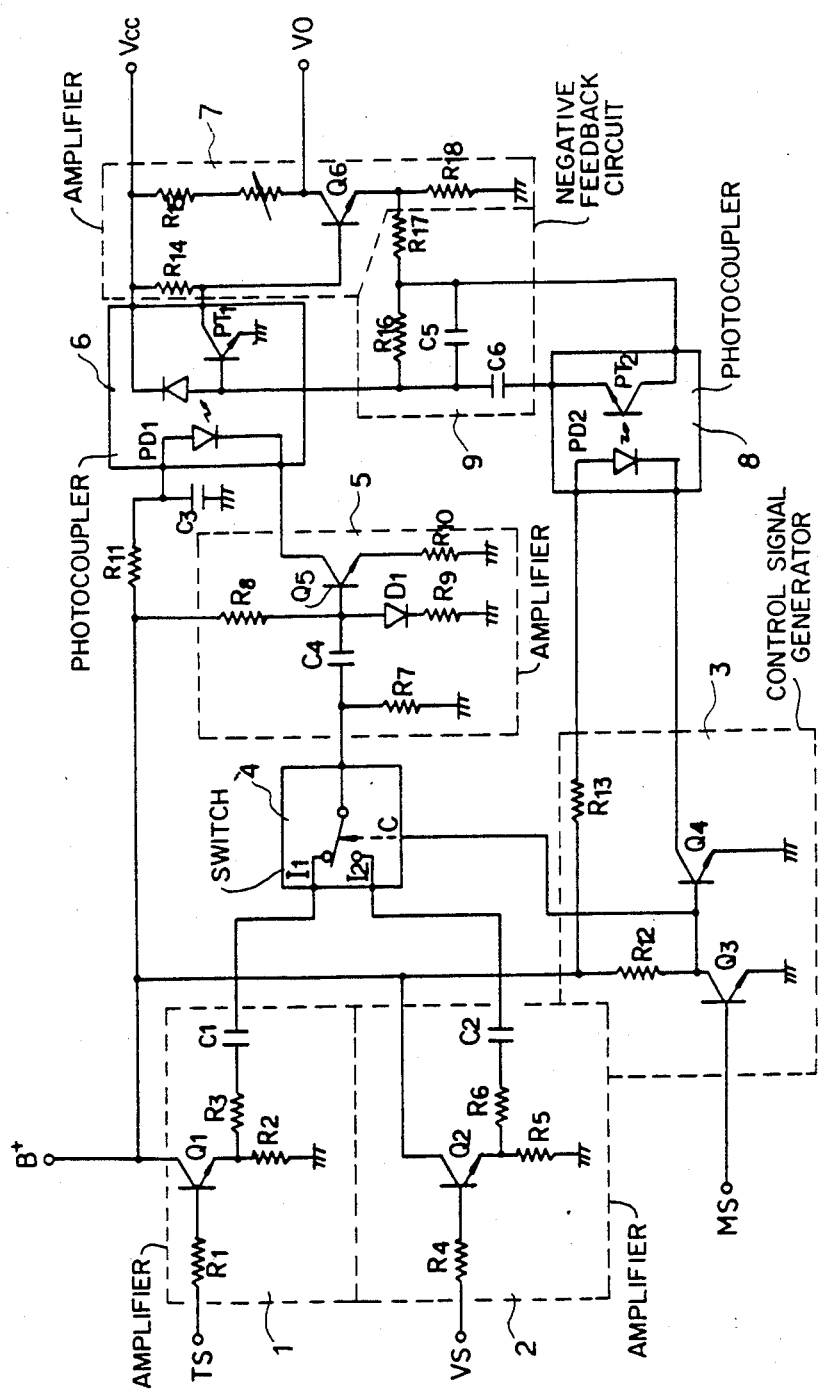

VIDEO SIGNAL COMPENSATING CIRCUIT OF A TV/VCR

BACKGROUND OF THE INVENTION

The present invention relates to a video signal compensating circuit for a TV/VCR which is a combination of a TV and a VCR, in particular to a video signal compensating circuit designed to compensate for the differences between TV video signals and VCR video signals.

In general, there are frequency differences between TV video signals and VCR reproduction signals. A conventional TV/VCR has the drawback of poor quality of pictures because the uncompensated TV broadcasting signals and VCR reproduction signals are supplied to the video signal processing element whereby the video noise signals due to the differences between the two signals are also input.

SUMMARY OF THE INVENTION

Accordingly, the object of the present invention is to provide a video signal compensating circuit for a TV/VCR which compensates the video signals in accordance with the characteristics of TV video signals while watching TV and in accordance with the characteristics of the VCR reproduction video signals during the reproduction of VCR thereby makes is possible to maintain the pictures clear.

The object of the present invention can be accomplished by selecting the TV video signal or the VCR reproduction signal by the TV/VCR mode selection signal, amplifying the selected video signal and outputting it through a photocoupler and a transistor, and compensating the frequency characteristics by negative feedback of the output signal of the transistor to the light receiving transistor of said photocoupler to vary the negative feedback time constant in dependence upon the "ON" or "OFF" state of the photocoupler by means of said TV/VCR mode selection signal.

BRIEF DESCRIPTION OF THE DRAWING

The invention will now be described in greater detail with reference to the accompanying drawing which is the circuit diagram of the video signal compensating circuit of a present invention.

DETAILED DESCRIPTION OF THE INVENTION

As shown in the drawing, the video signal compensating circuit according to the present invention comprises a first amplifier means, 1 which amplifies the TV video signal input from a TV video signal input terminal TS, a second amplifier means 2 which amplifies the VCR video signal input from a VCR video signal input terminal VS, a control signal generator means 3 which generates the control signal in accordance with the TV/VCR mode selection signal input from a TV/VCR mode signal input MS, a switching element 4 which outputs one of the output signals of said two amplifiers, 1 and 2 in dependence upon the control signal of the control signal generator means 3, a third amplifier means 5 which amplifies the output signal of the switching element 4, a first photocoupler 6 which outputs a signal proportional to the output signal of the third amplifier means 5, an output amplifier means 7 which amplifies and outputs the output signal of the photocoupler 6, a second photocoupler 8 which is turned on and off depending upon the level of the control signal of said control signal generator means 3, and a negative feedback circuit 9 which varies the emitter output signal of the transistor $Q_6$ of said output amplifier means 7 in dependence upon the "ON" or "OFF" condition of the photocoupler 8 and then negatively feeds back a signal to the base of the light receiving transistor $PT_2$ of said photocoupler 6. In this circuit, the switching element 4 is constructed so that then a low voltage level signal is applied to its control terminal C, its terminal $I_1$ is connected to the amplifier 5, and when a high voltage level signal is applied to its control terminal C, its terminal $I_2$. In the drawing, B+ and Vcc are power source terminals and VO is a video signal output terminal.

The operation and effect of the present invention will now be described in more detail. When power is applied to the power source terminals B+ and Vcc and a TV video signal is applied to the base of the transistor $Q_1$ via the resistor $R_1$ of the first amplifier means 1, the output TV video signal from the emitter thereof is applied to terminal $I_1$ of the switching element 4 through the resistor $R_3$ and the coupling capacitor $C_1$.

When a VCR video signal is applied to the VCR video signal input terminal VS, since the VCR video signal is applied to the base of the transistor $Q_2$ via the resistor $R_4$ of the second amplifier means 2, the output VCR video signal from the emitter thereof is applied to the other terminal $I_2$ of the switching element 4 via the resistor $R_6$ and the coupling capacitor $C_2$.

In this state, when a high voltage level TV mode selection signal is input to the TV/VCR mode selection signal input MS, the high voltage level signal turns the transistor $Q_3$ of the control signal generator means 3 "ON" and then a low voltage level signal is output from its collector. Since the low voltage level signal is applied to the control terminal C of the switching element 4, the moving terminal of the switching element 4 becomes connected to terminal $I_1$. The TV video signal input to terminal $I_1$ of the switching element 4, therefore, passes through the switching element 4 and then is applied to the base of the transistor $Q_5$ via the capacitor $C_4$ of the 17 third amplifier means 5 and thereby amplified. Thus, a current proportional to the TV video signal applied to the base of the transistor $Q_5$ appears at to the collector of this transistor $Q_5$ and the brightness of the light emitting diode $PD_1$ of the photocoupler 6 is regulated by the intensity of the collector current. Therefore, since the light generated by the light emitting diode $PD_1$ is transmitted to the light receiving transistor $PT_1$ of the photocoupler 6, a signal proportional to the intensity of the incident light is output from the collector of the light receiving transistor $PT_1$ and this output signal is applied to the base of the transistor $Q_6$ of the output amplifier means 7 and thus amplified signal is output to the video signal output terminal VO.

In this state, as the low voltage level signal output from the collector of the transistor $Q_3$ of said control signal generator means 3 is applied to the base of the transistor $Q_4$ and turns it off, the light emitting diode $PD_2$ of the phtocoupler 8 is extinguished and the light receiving transistor $PT_2$ thereof is turned off. Thus, the signal output from the emitter of the transistor $Q_6$ of the output amplifier means 7 is negatively fedback to the base of the light receiving transistor $PT_1$ of the photocoupler 6 through only the resistor $R_{17}$, $R_{16}$ and the capacitor $C_5$ of the negative feedback element 9.

Consequently, the signal through the resistors $R_{16}$, $R_{17}$ and the capacitor $C_5$ of the negative feedback element 9 compensates the frequency characteristics. Therefore, the frequency characteristics of the TV video signal can be compensated by setting the values of the resistors $R_{16}$, $R_{17}$ and the capacitor $C_5$ according to the frequency characteristics of the TV video signal.

On a other hand, when the low voltage level VCR mode selection signal is input to the TV/VCR mode selection signal input terminal MS, the low voltage level signal turns off the transistor $Q_3$ of the control signal generator means 3 and then a high voltage level signal is output from its collector. Since the high voltage level signal is applied to the control terminal C of the switching block 4, the moving terminal of the switching block 4 becomes connected to its other terminal $I_2$. Therefore, the VCR video signal input to the other terminal $I_2$ of the switching element 4 passes through the switching element 4. Thus, the VCR video signal selected and output from the switching element 4 is amplified by the third amplifier means 5 and then is output terminal to the video signal output VO via the photocoupler 6 and the output amplifier means 7 as described previously.

In this instance, since the high voltage level signal output from the collector of the transistor $Q_3$ of the control signal generator means 3 turns the transistor $Q_4$ on, a current passes through the light emitting diode $PD_2$ of the photocoupler 8 and the light emitting diode $PD_2$ emits light. Therefore, the light receiving transistor $PT_2$ of the photocoupler 8 is turned on and the capacitor $C_6$ of the negative feedback circuit, 9 becomes connected in parallel with the capacitor $C_5$. Thus, the signal output from the emitter of the transistor $Q_6$ of the output amplifier means 7 is negatively fedback to the base of the light receiving transistor $PT_1$ of the photocoupler 6 via the resistors $R_{16}$, $R_{17}$ and the capacitors $C_5$, $C_6$ of the negative feedback circuit 9 and thereby compensates the frequency characteristics of the VCR video signal.

Consequently, the frequency characteristics of the VCR video signal can be compensated by setting the values of the resistors $R_{16}$, $R_{17}$ and the capacitors $C_5$, $C_6$ according to the frequency characteristics of the VCR video signal.

As described above in detail, the present invention compensates the frequency characteristics by varying the negative feedback time constant as a function of the frequency characteristics of the TV video signal and the VCR video signal, and thereby prevents the input of video noise signals dependent upon the frequency differences between the TV video signal, and the VCR video signal and consequently provides clear pictures.

I claim:

1. A video signal compensating circuit for a TV/VCR comprising a first amplifier means for amplifying a TV video signal, a second amplifier means for amplifying a VCR video signal, a control signal generator means for generating a control signal in accordance with a TV/VCR mode selection signal, a switching element for selecting and outputting one of the output signals of said first and second amplifier means in dependence upon the control signal of said control signal generator means, a third amplifier means for amplifying the output signal of said switching element, a first photocoupler for outputting a signal proportional to the output signal of said third amplifier means, an output amplifier means for amplifying the output signal of said first photocoupler, a second photocoupler connected to be turned on and off in response to the control signal of said control signal generator means, and a negative feedback element connected to vary an emitter output signal of a transistor of said output amplifier means in response to "ON" or "OFF" states of said second photocoupler and to then feedback negatively to a base of a light receiving transistor of said first photocoupler.

2. A video signal compensating circuit for a TV/VCR comprising a first coupling means for coupling a TV video signal, a second coupling means for coupling a VCR video signal, a control signal generator means for generating a mode control signal in accordance with a TV/VCR mode selection signal, a first photocoupler means, a switching means for selectively connecting one of the output video signals of said first and second coupling means to said first photocoupler means according to the mode control signal of said control signal generator means, said first photocoupler means having a control terminal coupled to said switching means whereby said photocoupler provides an output signal proportional to the video signal output from either said first coupling means or said second coupling means in dependence upon said mode control signal, an output amplifier means for amplifying the output signal of said first photocoupler means, a second photocoupler means connected to be turned to an "ON" or "OFF" state as a function of the mode control signal of said control signal generator means whereby a control signal is provided to said output amplifier means, said output amplifier means including a negative feedback means connected to control the frequency characteristics of said output amplifier as a function of said mode control signal.

3. The video signal compensating circuit of claim 2, wherein said negative feedback means is connected to vary an output signal of an electronic control means of said output amplifier means according to "ON" or "OFF" state of said second photocoupler means.

4. The video signal compensating circuit of claim 2, wherein said negative feedback means is connected to a control terminal of said first photocoupler means.

5. The video signal compensating circuit of claim 3, wherein said negative feedback means is also connected to a control terminal of the first photocoupler means.

6. A video signal compensating circuit for TV and VCR video signals, comprising control signal generator means for generating a mode control signal in response to a TV/VCR mode selection signal, switching means for receiving the TV and VCR video signals and selectively outputting one of them in response to the mode control signal, first translating means connected to receive the output from the switching means and having an output, output amplifier means connected to the output of the first translating means for providing a compensated video signal output, negative feedback means having a varying feedback time constant connected to the output amplifier means, said negative feedback means comprising means under control of the mode control signal for applying varying negative feedback to the output amplifier means.

7. A circuit as set forth in claim 6, wherein the first translating means has a control input, and said negative feedback means is connected to the control input of the first translating means for applying negative feedback to said output amplifier means.

8. A video signal compensating circuit for a TV/VCR comprising a first input circuit for receiving a TV video signal, a second input circuit for receiving a VCR video signal, an output amplifier having an input circuit and an output circuit, a switching and control circuit for selectively coupling said first and second input circuits to said input circuit of said output amplifier, said output amplifier having a negative feedback circuit having a feedback impedance coupled between the input and output circuits of said output amplifier, said switching and control circuit comprising means for varying said impedance to provide a negative feedback that is different when said first input circuit is coupled to said output amplifier than when said second input circuit is coupled to said output amplifier.

9. The video signal compensating circuit of claim 8 wherein said means for varying said impedance comprises a photocoupler connected to control said feedback impedance.

10. The video signal compensating circuit of claim 8 wherein said switching and control circuit comprises a photocoupler for coupling video signals to said output amplifier.

* * * * *